March 7, 1933.  E. O. BEARDSLEY  1,900,221
THERMOSTATICALLY CONTROLLED MIXING DEVICE
Filed Nov. 19, 1930
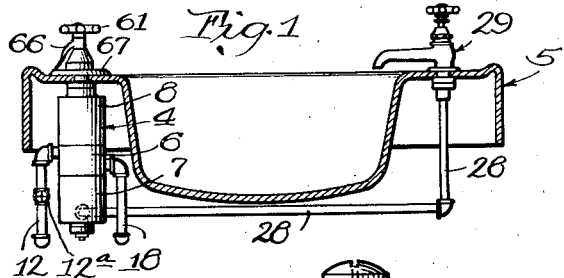
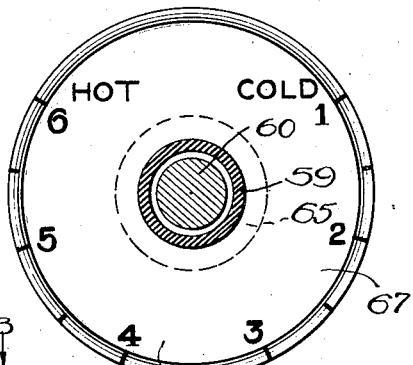
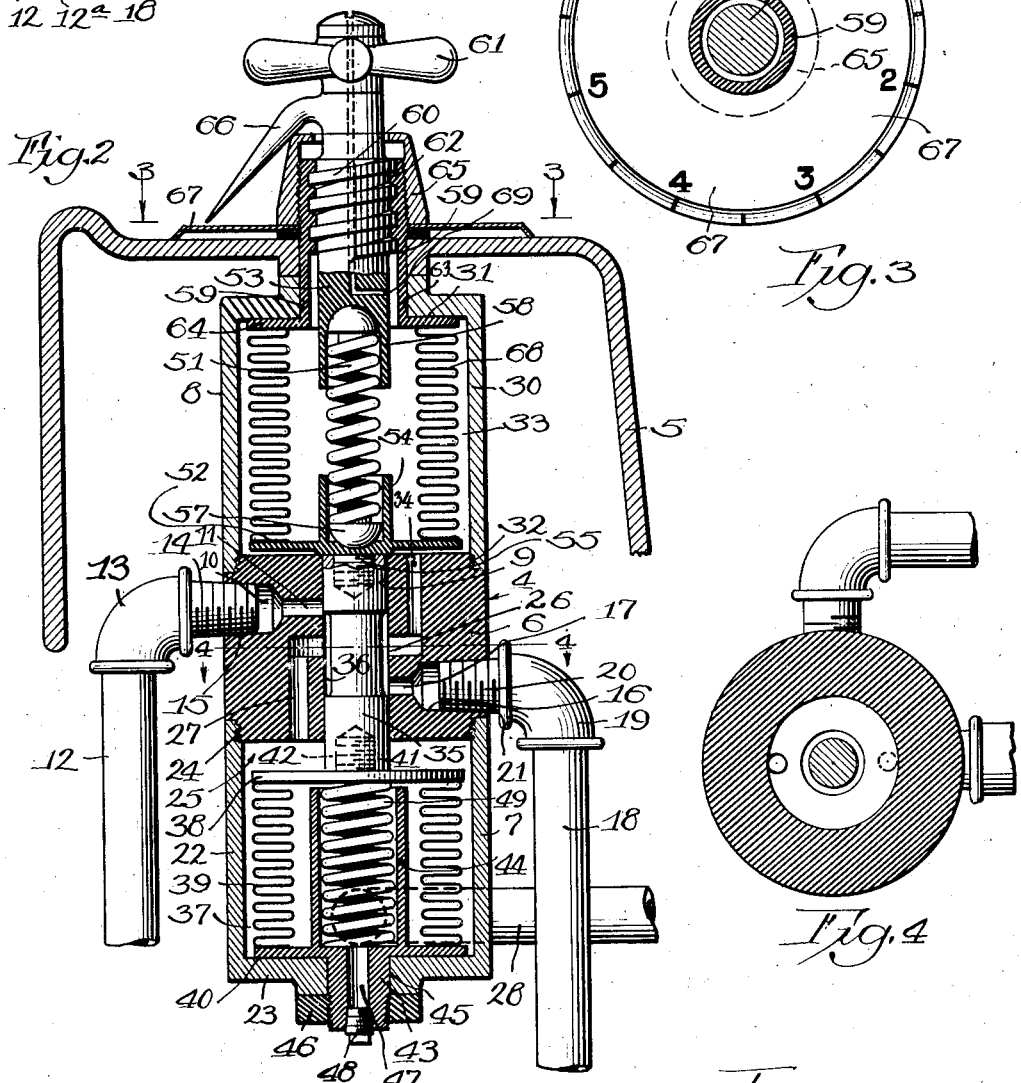
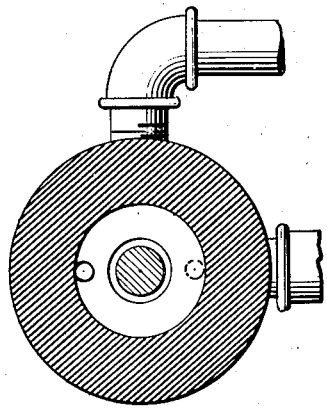
Inventor,
Elmer O. Beardsley
By Fred Gerlach
his Atty.
Witness:
Chas. R. Toursh Patented Mar. 7, 1933

1,900,221

UNITED STATES PATENT OFFICE

ELMER O. BEARDSLEY, OF CHICAGO, ILLINOIS, ASSIGNOR TO THE BEARDSLEY & PIPER COMPANY, OF CHICAGO, ILLINOIS, A CORPORATION OF ILLINOIS

THERMOSTATICALLY CONTROLLED MIXING DEVICE

Application filed November 19, 1930. Serial No. 496,639.

The invention relates generally to thermostatically controlled devices for mixing hot and cold water. More particularly the invention relates to that type of mixing device which is used in connection with showers, sinks or wash basins and comprises (1) a body having a pair of inlet ports for the hot and cold water; (2) a jacket which is attached to or associated with the body, forms a mixing chamber for the water and embodies a discharge opening for the mixed water; (3) a piston which is mounted in the body and is movable between the inlet ports to vary the proportion of the hot and cold water admitted to the chamber for mixing purposes; and (4) an adjustable thermostatic element which is disposed in the chamber, embodies an expansible and contractible bellows and operates in response to changes in temperature of the water in the mixing chamber, to shift the piston so as to maintain at a predetermined temperature the water that is discharged from the jacket through the discharge opening.

Heretofore it has been customary in the manufacture of mixing devices of this type, to encase the bellows of the thermostatic element in a rigid housing in order to prevent collapse of the bellows and displacement of the piston whenever there is an increase in the pressure of the water in the mixing chamber as the result of cutting off or lessening the discharge of water from the jacket. In practice it has been found that a housing of this character, although efficient in preventing the bellows from collapsing and thus causing a change in the temperature of the mixed water, renders the thermostatic element less sensitive and results in the mixer failing accurately to maintain the mixed water at a constant temperature.

One object of the present invention is to provide a thermostatically controlled mixing device of the type under consideration which is an improvement upon and is more efficient in operation than previously designed mixers of the same general character by reason of the fact that the bellows of the thermostatic element is in direct contact with the water in the mixing chamber and hence is extremely sensitive, and there is included simple means for counteracting the effect of the pressure of the water in the chamber on the bellows.

Another object of the invention is to provide a water mixer of the aforementioned type in which the bellows of the thermostatic element is connected to one end of the piston and the means for counteracting the effect of the pressure of the water in the mixing chamber consists of a bellows which is connected to the other end of the piston and is surrounded by water under the same pressure as that in the chamber.

A further object of the invention is to provide a mixing device of the type here under consideration in which the body and piston are of new and improved construction and the thermostatic element is adjusted by means of a compression spring which is housed within the bellows that is used to equalize the pressure of the water on the piston.

A still further object of the invention is to provide a water mixing device of the type to which this invention relates, which consists of but a small number of parts, embodies no packing glands and may be readily assembled.

Other objects of the invention and the various advantages and characteristics of the present mixer construction will be apparent from a consideration of the following detailed description.

The invention consists in the several novel features which are hereinafter set forth and are more particularly defined by the claims at the conclusion hereof.

In the drawing which accompanies and forms a part of this specification or disclosure and in which like numerals of reference denote corresponding parts throughout the several views:

Figure 1 is a perspective illustrating a mixer embodying the invention in connection with the hot and cold water pipes of a sink;

Figure 2 is a vertical section of the mixer, showing the arrangement of the various parts and exhibiting in detail the construction of the bellows for counteracting the effect of the pressure of the water on the bellows of the thermostatic element;

Figure 3 is a horizontal section taken on the line 3—3 of Figure 2; and

Figure 4 is a horizontal section taken on the line 4—4 of Figure 2, and disclosing the cross-sectional construction of the body.

The mixer which forms the subject matter of the invention comprises a casing 4 and is adapted to be used, as hereinafter described, to supply water of a predetermined temperature. The casing is illustrated in Figure 1 of the drawing as being associated with a sink 5 and consists of a body 6, a lower jacket 7 and an upper jacket 8. The body 6 is adapted to extend vertically and has formed in the central portion thereof a bore 9. This bore is of uniform diameter throughout its entire length and extends through the top and bottom faces of the body. The upper end of the body is provided with a horizontally extending inlet 10. The latter communicates with the bore 9 through a port 11 and is adapted to receive cold water from a pipe 12. This pipe is connected to a supply reservoir or water main and is attached to the body 6 by means of an elbow 13 and a nipple 14. It embodies a check valve 12$^a$ so as to prevent the back-flow of water therethrough. The nipple 14 extends into the inlet 10 and is held in place by means of a screw thread 15. The bottom of the body 6 is provided with a hot water inlet 16 which extends horizontally and communicates with the bore 9 through a port 17. Hot water is supplied to the inlet by a pipe 18 which is connected to any suitable source of hot water supply and is attached to the body by means of an elbow 19 and a nipple 20. The latter extends into the outer end of the inlet 16 and is held in connected relation with respect to the body by a screw thread 21. The hot water inlet 16 is preferably located diametrically opposite the cold water inlet 10.

The jacket 7 is formed of a one-piece casting and consists of a cylindrical side wall 22 and a circular bottom 23. The side wall 22 is connected removably to the lower end of the body 6 by a screw thread 24 and forms with the bottom 23 a mixing chamber 25 for the cold and hot water that is delivered to the casing through the pipes 12 and 18. The mixing chamber 25 communicates with the bore 9 through an annular chamber 26 and a vertically extending duct 27. The chamber 26 is formed in the central portion of the body 6 and surrounds the bore 9. It is positioned midway between the ports 11 and 17 and receives cold water from the inlet 10 via the port 11 and the bore 9 and hot water from the inlet 16 via the port 17 and the bore. The duct 27 communicates with one side of the annular chamber 26 and discharges the water downwardly into the chamber 25 where it is mixed and then discharged from the casing into a pipe 28. The latter is connected to the side wall 22 of the jacket 7 and is provided with a valve 29 whereby the passage of the water therethrough may be controlled. If desired, the discharge end of the pipe 28 may be positioned so as to direct the mixed water into the sink 5.

The jacket 8 is similar in construction to the jacket 7 and consists of a cylindrical side wall 30 and a circular top wall 31. The side wall 30 is connected by a screw thread 32 to the upper end of the body 6 and forms with the top wall 31 a chamber 33. This chamber communicates with and receives water from the annular chamber 26 through a vertically extending duct 34. The latter extends between and is located diametrically opposite the duct 27 and extends between one side of the annular chamber 26 and the top face of the body.

To vary the flow of water through the ports 11 and 17, a piston 35 is provided. This piston is mounted slidably in the bore 9 and is cut away at the central portion thereof to form an annular passageway 36. The latter serves to conduct cold water downwardly from the port 11 into the annular chamber 26 and to conduct hot water upwardly from the port 17 into the chamber 26. The upper end of the piston 35 cooperates with the inner end of the port 11 to form a valve for controlling the amount of cold water that is discharged into the chamber 25 from the inlet 10. The lower end of the piston cooperates with the inner end of the port 17 and serves as a valve for controlling the passage of hot water to the mixing chamber. When the piston 35 is shifted upwardly, the port 11 is opened and the port 17 is closed, and consequently there is a full flow of cold water into the mixing chamber. When the piston 35 is shifted downwardly, the port 11 is closed and the port 17 is opened, and as a result the flow of cold water into the mixing chamber is cut off and there is a maximum or full flow of hot water into the chamber 26 and through the duct 27. In view of this arrangement, the proportion of the cold and hot water admitted into the chamber 25 is varied in response to the position or action of the piston.

The piston is shifted automatically in order to maintain the water in the mixing chamber 25 at a predetermined temperature by means of a thermostatic element 37. This element is located in the mixing chamber and comprises a disk-like upper head 38, a bellows 39 and a disk-like lower head 40. The upper head 38 is provided with a stud 41 which extends into a socket in the lower end of the piston and is held in place by means of a screw thread 42. The lower head 40 is provided with a depending stem 43 and an upwardly extending annular flange 44. The stem extends through an aperture 45 in the bottom 23 of the jacket 7 and is provided at its outer end with a nut 46. The latter engages a boss on the under face of the wall 23 and operates to clamp the head 40 against the upper face of the wall 23 so as to form a fluid tight connection therebetween and prevent leakage of water through the aperture 45. The bellows 39 is in direct contact with the water in the mixing chamber 25. It surrounds the annular flange 44 and is filled with any suitable liquid which contracts and expands readily in response to changes in temperature. The lower end of the bellows is anchored to the marginal part of the head 40. The upper end of the bellows is connected to the head 38. When the temperature of the water in the mixing chamber 25 increases for any reason whatsoever beyond that for which the thermostatic element is set, the liquid in the bellows expands and thus causes, through the medium of the bellows and the head 38, the piston 35 to be shifted upwardly so as to increase the flow of cold water through the port 11 and decrease the flow of hot water through the port 17. When the temperature of the water in the mixing chamber 25 decreases, the liquid in the bellows contracts and thus causes the piston to be shifted downwardly so as to increase the flow of hot water and decrease the flow of cold water. The liquid is introduced into the bellows through a duct 47 in the stem 45. This duct is normally closed by a plug 48 which is connected by a screw thread to the lower end of the stem. A coil spring 49 is housed within the annular flange 44 and serves to exert an upward pressure on the head 38.

A compression spring 51 is disposed in the chamber 33 in the upper jacket 8 and is applied to the upper end of the piston 35. This spring operates to counteract the effect of the spring 49 and extends between the disk-like head 52 and a vertically extending stem 53. The head 52 is provided with an upwardly extending annular flange 54 and a depending stud 55. The latter extends into a socket in the upper end of the piston 35 and is secured in place by a screw thread 56. The lower end of the spring 51 is housed within the flange 54 and is provided with a rounded member 57 which bears against the upper face of the head 34. The upper end of the compression spring extends into an open-ended socket 58 which is formed in the lower end of the stem 53. The stem extends through a vertically extending sleeve 59 and is provided at its upper end with an external screw thread 60 and a handle 61. The external screw thread 60 engages an internal screw thread 62 on the upper end of the sleeve 59 and cooperates therewith to shift the stem 53 axially when it is turned by manipulation of the handle 61. By shifting the stem 53 axially, the compression of the spring 51 may be adjusted so as to control the thermostatic element 37 to maintain the water in the mixing chamber 25 at any predetermined temperature. When the stem 53 is shifted downwardly by means of rotating the handle 61 in one direction, the spring 51 is placed under greater compression and consequently greater downward pressure is applied to the piston 35 with the result that it takes greater internal pressure to expand the bellows and an adjustment of the thermostatic element 37 is effected whereby the water in the chamber is maintained at a high temperature. When the handle 61 is turned in the opposite direction, the stem 53 is raised. This operates to decrease the compression of the spring 51 and thus to adjust the thermostatic element so as to maintain the water in the chamber at a low temperature. The sleeve 59 through which extends the stem 53, extends through a circular aperture 63 in the top wall of the jacket 8 and is provided at its lower end with an outwardly projecting flange 64 which engages the under face of the wall 31. The upper end of the sleeve 59 extends through the sink 52 and is provided at its upper end with a nut 65 which supports the mixer from the sink and operates when tightened to clamp the flange 64 against the wall 31 so as to form therebetween a water tight connection and prevent the escape of water from the chamber 33 through the aperture 63. A pointer 66 is secured to the upper end of the stem 53 and is positioned beneath the handle 61. This pointer operates in conjunction with a dial 67 to indicate the temperature at which the water 25 in the mixing chamber is maintained by the thermostatic element 37. The dial 67 is marked in any suitable manner and is clamped by the nut 65 against the sink.

In order to counteract the effect of the pressure of water on the bellows 39 and thus prevent the pressure of the water in the mixing chamber from displacing the piston 35 when the valve 29 is fully or partially closed, or there is a drop in the entrance pressure of the hot or cold water, a bellows 68 is provided. This bellows is located within the chamber 33, surrounds the compression spring 51 and is in direct contact with the water within the jacket 8. It is equal in diameter to the bellows 39 and results in the piston 35 being perfectly balanced. The upper end of the bellows 68 is connected to the flange 64 at the lower end of the sleeve 59. The lower end of the bellows is connected to the outer marginal part of the head 52. The interior of the bellows communicates with atmosphere through a duct 69 which extends longitudinally through the stem 53. By virtue of the fact that the pressure of the water in the chamber 33 is equal to the pressure of the water in the mixing chamber 25, the force of the water on the piston is equalized and consequently there is no likelihood of the piston being displaced when the valve 29 is closed. Inasmuch as the compression spring 51 is housed within the bellows 68, the construction as a whole is simplified and there is no need for any packing gland.

In using the mixer, the handle 61 is turned so as to shift the stem 53 into an intermediate position when it is desired to obtain water of medium temperature from the discharge pipe 28. In this position of the stem, the compression of the spring 51 is such that the thermostatic element 37 retains the piston 35 in a position where the ports 11 and 17 are partially opened and a limited supply of cold water from the inlet 10, together with a limited supply of hot water from the inlet 16, is introduced into the mixing chamber. The water, after being introduced into the chamber 25, flows around the bellows 39 and is then discharged through the pipe 28. In the event that the entrance pressure of the hot water should diminish or the temperature of the water in the chamber 25 should decrease for any reason whatsoever, the change in temperature causes the liquid in the bellows to contract with the result that the piston 35 is shifted downwardly and thus decreases the flow of cold water through the port 11 and increases the flow of hot water through the port 17. When the temperature of the water in the mixing chamber rises, the liquid within the bellows expands and shifts upwardly the piston 35. This causes a greater inflow of cold water and a less inflow of hot water and results in the thermostatic element maintaining the water that is discharged through the pipe 28 at a constant temperature. When it is desired to increase the temperature of the water that is discharged through the pipe 28, the handle 61 is turned so as to cause the pointer 66 to register with the hot water marking on the dial 67 and the stem 53 to be shifted into its lowermost position. When the stem 53 is in its lowermost position, the spring 51 is placed under maximum compression and causes the thermostatic element 57 to regulate the piston 35 so as to open fully the port 17 and shut off the supply of cold water through the port 11. The thermostatic element 37 operates automatically to control the piston 35 so that the water that is discharged through the pipe 28 is maintained at any predetermined temperature. By turning the handle 61, the mixer may be adjusted so as to supply water at any desired or predetermined temperature. During use of the mixer the bellows 68 are under substantially the same pressure as the bellows 39 by virtue of the fact that the chamber 33 is filled with water from the chamber 26. As a result of this arrangement, the force of the water on the piston 35 is equalized and consequently there is no tendency for the piston to be displaced when the valve 29 is closed.

The mixer which is disclosed herein may be manufactured at a comparatively low cost by virtue of the fact that it embodies but a small number of parts. In view of the fact that no packing glands are used and the water is permitted to flow into direct contact with the bellows of the thermostatic element, the mixer is extremely efficient in operation.

Whereas the mixer has been described in connection with the mixing of hot and cold water, it is to be understood that the mixer may be used for mixing other fluids. It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. In a mixing device of the character described, the combination of a casing comprising a substantially cylindrical body having a bore extending longitudinally therethrough, a transverse hot fluid inlet port communicating with one end of the bore, a transverse cold fluid inlet port communicating with the other end of the bore, an annular chamber positioned between the ports and extending around and communicating with the central portion of the bore so as to receive fluid from the ports, an outlet-equipped jacket connected to one end of the casing and adapted to receive fluid from the annular chamber via a longitudinal duct in the body and between the chamber and the said one end of the body, and a second jacket connected to the other end of the body and having the interior thereof communicating with the annular chamber via a longitudinal duct in the body and between the chamber and the said other end of the body, a piston for varying the proportion of the fluids passing into the annular chamber, mounted slidably in the bore and having valve-forming ends for controlling the ports and a reduced or stem-like central portion around which the fluids pass to the annular chamber, a thermostatic element for automatically shifting the piston to maintain the mixed fluid at a predetermined temperature, disposed in the first mentioned jacket and embodying an expansible and contractible bellows connected to one end of the piston and in direct contact with the fluid in the interior of said first mentioned jacket, the means for counteracting the effect of the pressure of the fluid on the bellows consisting of a second expansible and contractible bellows disposed in the interior of the second mentioned jacket applied to the other end of the piston and surrounded by the fluid in the interior of said second mentioned jacket.

2. In a mixing device of the character described, the combination of a casing comprising a solid, substantially cylindrical body having external screw threads at the ends thereof and a pair of transverse inlet ports for hot and cold fluids, a cup-shaped jacket having the side wall thereof connected removably to one of the screw threads and forming a mixing chamber for the fluids, and a second cup-shaped jacket having the side wall thereof connected removably to the other screw thread and forming a second chamber, means for delivering the fluids from the ports to the mixing chamber, a piston extending longitudinally through the body and movable between the ports to vary the proportion of the fluids admitted into the mixing chamber via the aforesaid delivery means, a thermostatic element for automatically shifting the piston to maintain the mixed fluid at a predetermined temperature, disposed in the mixing chamber and embodying an expansible and contractible bellows connected to one end of the piston and in direct contact with the fluid in the mixing chamber, means for introducing mixed fluid into the second chamber, and means for counteracting the effect of the pressure of the fluid in the mixing chamber on the bellows consisting of a second expansible and contractible bellows disposed in the second chamber, applied to the other end of the piston and surrounded by the mixed fluid in said second chamber.

3. In a mixing device of the character described, the combination of a casing comprising a body and means forming at one end of the body a mixing chamber with an outlet and a second chamber at the other end of the body, said body having a pair of inlet ports for hot and cold fluids, a piston mounted slidably in the body and movable between the ports to vary the proportion of the fluids admitted into the mixing chamber, an adjustable thermostatic element for automatically shifting the piston to maintain the mixed fluid at a predetermined temperature, disposed in the mixing chamber and embodying an expansible and contractible bellows connected directly to one end of the piston and in direct contact with the fluid in the mixing chamber, means for introducing mixed fluid into the second chamber, means for counteracting the effect of the pressure of the fluid in the mixing chamber on the bellows consisting of a second bellows disposed in the second chamber, connected directly to the other end of the piston and surrounded by the mixed fluid in said second chamber, and means for adjusting the thermostatic element including a compression spring housed in the second bellows.

Signed at Chicago, Illinois, this 8th day of November, 1930.

ELMER O. BEARDSLEY.